ically inwardly projecting bristle-type blades for effecting a scrubbing action on the exterior of an associated teat in response to spray jets of liquid being upwardly directed onto the blades and the associated teat from the cup lower inlet, and the upper axial end of the cup includes a circumferentially extending zone of upwardly projecting flexible blades for contacting the udder area immediately surrounding the associated teat and tactilly stimulating the udder to facilitate quick and complete milk "let-down". The flexible blades carried by the upper circumferential zone of the cup are also caused to oscillate back and forth, laterally, in response to spray jets of liquid being discharged into the cup from the lower end thereof with the effect that the udder is tactilly stimulated in substantially the same as that accomplished naturally by the tongue of a nursing calf.

United States Patent [19]

Sparr, Sr.

[11] 4,305,346
[45] Dec. 15, 1981

[54] TEAT WASHING CUP WITH MILK LET-DOWN STIMULATING BLADES

[76] Inventor: Anders V. Sparr, Sr., Rte. 1, Milligan Rd., Waupun, Wis. 53963

[21] Appl. No.: 191,307

[22] Filed: Sep. 26, 1980

[51] Int. Cl.³ .......................................... A61D 11/00
[52] U.S. Cl. ...................................... 119/1; 119/158
[58] Field of Search ............... 119/1, 159, 158; 401/9, 401/10, 11; 128/248; 15/29

[56] References Cited

U.S. PATENT DOCUMENTS

| 2,952,860 | 9/1960 | George | 15/29 |
| 3,713,423 | 1/1973 | Sparr, Sr. | 119/1 |
| 4,034,714 | 7/1977 | Umbaugh et al. | 119/14.18 |

*Primary Examiner*—Hugh R. Chamblee
*Attorney, Agent, or Firm*—Harvey B. Jacobson

[57] ABSTRACT

An upwardly opening cup is provided including a lower inlet for upwardly directing spray jets of fluid thereinto and open and contoured at its upper end to fittingly accommodate not only a depending teat but also the portion of the udder immediately surrounding the selected teat. The interior of the cup includes radi-

3 Claims, 3 Drawing Figures

TEAT WASHING CUP WITH MILK LET-DOWN STIMULATING BLADES

BACKGROUND OF THE INVENTION

More recently it has become known that mechanical milking processes can be speeded up, the occurance of teat infection due to mechanical milking processes being carried out without complete milk "let-down" and the incidence of excessive vacuum at the teats can be effectively reduced if steps are carried out prior to milking in order to assure complete "milk let-down". Accordingly, a need exists for structure whereby complete "milk let-down" may be accomplished before initiation of mechanical milking processes.

Various forms of teat washing devices heretofore have been known including the teat cleansing apparatus disclosed in prior U.S. Pat. No. 3,713,423. However, although this previously known teat cleansing apparatus is operative to accomplish a substantially complete teat cleansing operation in a reasonably short period of time, it is not operative to function as a "milk let-down" stimulating structure. Of course, at least an appreciable amount of time must be spent in washing teats prior to a mechanical milking operation and the subject of the instant invention is operative to effect a substantially complete "milk let-down" during the same period of time usually carried out manually for the purpose of teat cleansing.

BRIEF DESCRIPTION OF THE INVENTION

The milk "let-down" stimulating apparatus of the instant invention is constructed not only in the form of a milk "let-down" apparatus but also as a teat cleansing apparatus, whereby the milk "let-down" operation may be carried out at the same time the teat cleansing operation is performed. In this manner, no additional time is required to effect the milk "let-down" operation in addition to the manual labor time required to effect the teat cleansing operation.

The main object of this invention is to provide an apparatus which may quickly effect a milk "let-down" function.

Another object of this invention is to provide an apparatus in accordance with the preceding object and which will also function as a teat cleansing apparatus during the same period of time the milk "let-down" function is accomplished.

Still another object of this invention is to provide a milk "let-down" apparatus whose operation is relative simple and functions in a manner almost identical to the manner in which a suckling calf's tongue functions to effect the necessary milk "let-down".

A final object of this invention to be specifically enumerated herein is to provide a milk "let-down" apparatus in accordance with the preceding objects and which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
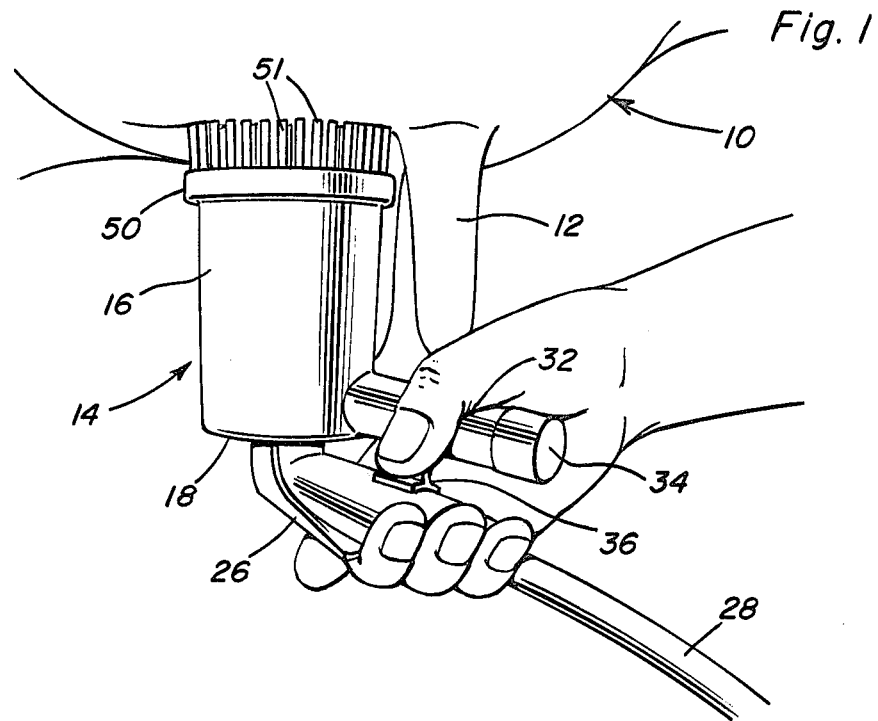
FIG. 1 is a fragmentary perspective view of a cow's udder with the milk "let-down" stimulating apparatus of the instant invention operatively associated therewith.
Figure 3:
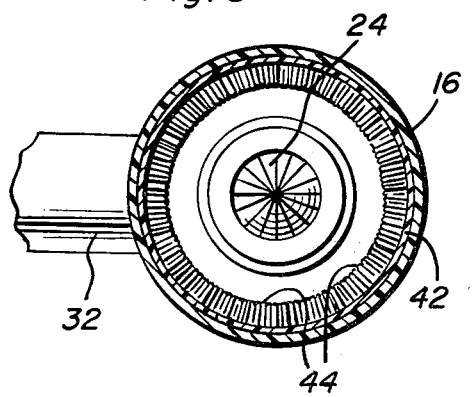
FIG. 3 is a horizontal sectional view taken substantially upon the plane indicated by the section line 3—3 of FIG. 2.
Figure 2:
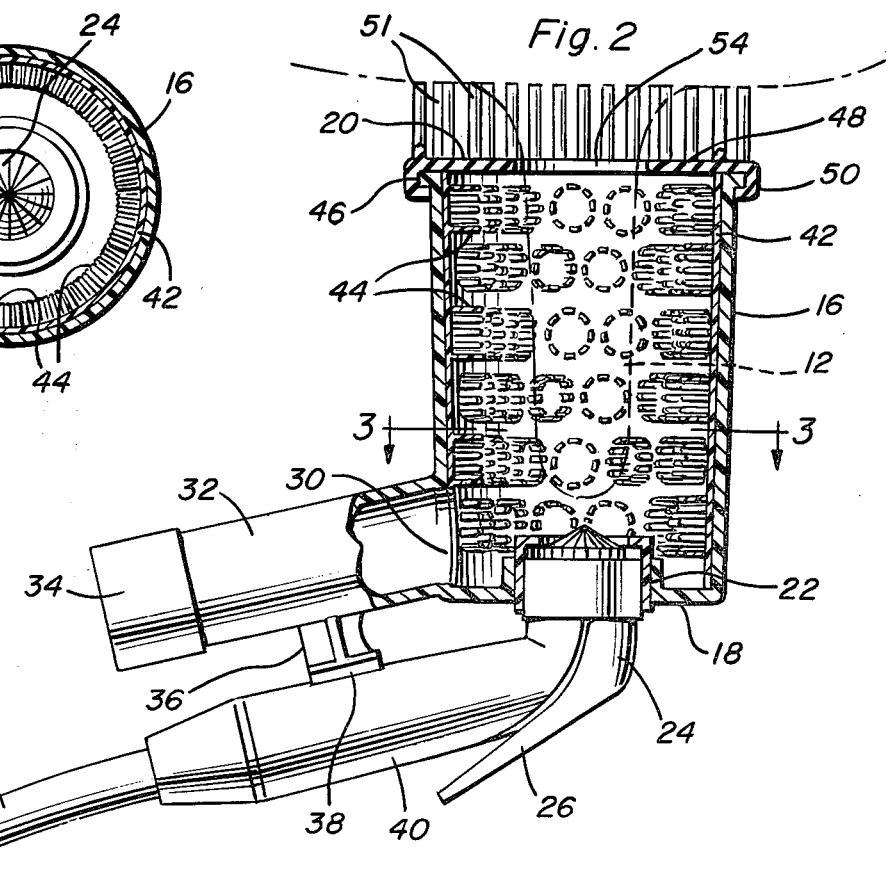
FIG. 2 is an enlarged fragmentary side elevational view of the apparatus illustrated in FIG. 1 and with major portions thereof being broken away and illustrated in vertical sections.

Referring now more specifically to the drawings the numeral 10 generally designates a cow's udder including depending teats 12.

The teat washing and milk "let-down" cup or apparatus is referred to in general by the reference numeral 14 and includes an upwardly opening generally cylindrical cup 16 including a bottom wall 18 and an open upper end 20. The bottom wall 18 includes a central female inlet fitting 22 into which the outlet end of an upwardly discharging spray nozzle 24 is frictionally telescoped. The spray nozzle 24 includes an actuating lever 26 and a fluid supply line 28 is coupled to the nozzle 24 for supplying cleaning liquids thereto under pressure.

The lower portion of the cup 16 includes a lateral outlet 30 about which the inlet end of a drain neck 32 is secured and drain neck 32 includes an outlet end over which a closure cap 34 is removably coupled. In addition, the drain neck 32 includes a downwardly projecting support 36 carrying a downwardly opening abutment 38 at its lower end against which the main body portion 40 of the spray nozzle 24 may be upwardly abutted.

The interior of the cup 16 is lined with a sleeve 42 of resilient material and the sleeve 42 includes circumferentially and axially spaced groups of inwardly projecting flexible blade type elements 44 for engaging and scrubbing the exterior of an associated teat 12. The blade elements 24 project substantially radially inwardly of the outer periphery of the cup 16 and the open upper end 20 of the cup 16 includes a circumferentially extending and outwardly projecting ridge 46. Further, the blade type elements 44 are of greater length than width and greater width than thickness.

An annular partial top wall 48 is provided and includes a down and inturned peripheral attaching flange 50 snap fittingly engaged over the upper end of the cup 16 and the partial top wall includes a plurality of circumferentially and radially spaced axially projecting resilient fingers 51 for upwardly abutting the underside portions of the udder 10 immediately surrounding the associated teat 12.

During a cleansing operation the spray nozzle 24 is utilized to direct upward spray jets of cleansing liquid into the bottom of the cup 16 and the spray jets of liquid not only contact the associated teat 12 but also the blade elements 14 and cause the latter to vibrate or laterally oscillate to perform a scrubbing action on the exterior of the teat 12. In addition, the fingers 51 upwardly abut and tactilly stimulate those portions of the udder 10 immediately surrounding the upper base portion of the associated teat 12. Some of the upwardly directed spray jets of water from the nozzle 24 pass upwardly through the central opening 54 in the top wall 48 and engage and thus laterally oscillate the fingers 51 for further tactile stimulation of the udder area immediately surrounding the upper base end of the associated teat 12.

Thus, it may be seen that an effective cleaning operation may be accomplished at the same time a tactile type stimulation of the udder 10 immediately surrounding the teat 12 is accomplished. Accordingly, not only is the apparatus 14 effective to clean an associated teat, but it is also effective to substantially duplicate the natural tactile stimulation of a cow's udder effected by the tongue of a nursing calf.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. For use on and in conjunction with a cow's udder just prior to initiating the milking step, a portable teat washing and milk "let-down" apparatus, said apparatus including an upwardly opening cup shaped body defining peripherally extending wall means surrounding a central cavity, said body including first elongated, stiff but flexible generally radially inwardly projecting and water jet vibratable fingers supported from said body and projecting into said cavity at point spaced about said body and vertically there along, the upper end of said body including a generally annular portion extending about said upper end and including second elongated stiff but flexible upstanding fingers supported therefrom at points spaced about and radially of said annular portion, of the lower end of cup shaped body including liquid sprayed jet discharge means operative to discharge spray jets of liquid upwardly into said cavity, said first and second fingers being engagable by said liquid spray jets for laterally deflecting and vibrating said fingers whereby said first fingers may contact and scrub the exterior surfaces of a teat projecting downwardly into said central cavity and said second fingers may engage and tactilly stimulate the portions of the cows udder disposed about the upper end of the depending teat projecting into the cup shaped body, said first fingers comprising blade-like fingers being of greater length than thickness or width and being of greater width than thickness, whereby jets of liquid impinging thereon will cause lateral vibration of said blade-like fingers.

2. The combination of claim 1 wherein said cup shaped body includes a lower end outwardly opening hollow drainage neck projecting laterally outwardly of one side of said cup shaped body and which functions, also, as a supportive handle for said apparatus, the inner end of said handle opening into the interior of said cup shaped body at one side thereof.

3. The combination of claim 1 wherein said cup shaped body includes a sleeve of resilient material removably positioned therein, said first fingers being carried by said sleeve.

* * * * *